(12) United States Patent
Candiani et al.

(10) Patent No.: US 9,109,872 B2
(45) Date of Patent: Aug. 18, 2015

(54) CALIBRATION DEVICE FOR MEASUREMENT GAUGES OF THE DIAMETER AND OTHER GEOMETRICAL CHARACTERISTICS OF CYLINDERS

(75) Inventors: Fausto Candiani, Magnago-Milan (IT); Paolo Gaboardi, Fino Mornasco-Como (IT); Claudio Trevisan, Cardano al Campo-Varese (IT); Flavio Stefano Bianchessi, Milan (IT)

(73) Assignee: TENOVA S.P.A., Milan (IT)

( * ) Notice: Subject to any disclaimer, the term of this patent is extended or adjusted under 35 U.S.C. 154(b) by 409 days.

(21) Appl. No.: 13/811,375

(22) PCT Filed: Jul. 7, 2011

(86) PCT No.: PCT/EP2011/003443
§ 371 (c)(1),
(2), (4) Date: Jan. 21, 2013

(87) PCT Pub. No.: WO2012/016628
PCT Pub. Date: Feb. 9, 2012

(65) Prior Publication Data
US 2013/0125615 A1 May 23, 2013

(30) Foreign Application Priority Data

Aug. 2, 2010 (IT) .............................. MI2010A1457

(51) Int. Cl.
| | |
|---|---|
| *G01B 11/08* | (2006.01) |
| *G01B 5/08* | (2006.01) |
| *B24B 49/04* | (2006.01) |
| *G01B 3/20* | (2006.01) |
| *G01B 3/30* | (2006.01) |
| *G01B 5/20* | (2006.01) |
| *G01B 21/04* | (2006.01) |

(52) U.S. Cl.
CPC ................ *G01B 5/08* (2013.01); *B24B 49/045* (2013.01); *G01B 3/20* (2013.01); *G01B 3/303* (2013.01); *G01B 5/20* (2013.01); *G01B 5/201* (2013.01); *G01B 21/042* (2013.01)

(58) Field of Classification Search
None
See application file for complete search history.

(56) References Cited

U.S. PATENT DOCUMENTS

| | | |
|---|---|---|
| 3,975,828 A | 8/1976 | Calcaterra |
| 4,335,516 A | 6/1982 | Edelstein |
| 4,821,421 A * | 4/1989 | Girardier et al. ................ 33/819 |
| 5,551,906 A | 9/1996 | Helgren |
| 6,061,922 A | 5/2000 | Tzeng |

\* cited by examiner

*Primary Examiner* — Robert R Raevis
(74) *Attorney, Agent, or Firm* — Themis Law

(57) ABSTRACT

A calibration device for gauges for the measurement of the geometrical characteristics of cylinders, such as the diameter, profile, rotundity and eccentricity errors, wherein such gauges include a pair of movable opposing arms equipped with feelers or sensors at their free ends, includes a pair of abutments reciprocally approachable and/or withdrawable by means of motors until a sample measure is obtained, as desired, within the measuring range of the gauge, on which the calibration device is assembled, revealed by means of measuring means cooperating with the abutments, such that consequently the feelers or sensors are respectively abutted or approached to the abutments to reveal the sample measure.

3 Claims, 10 Drawing Sheets

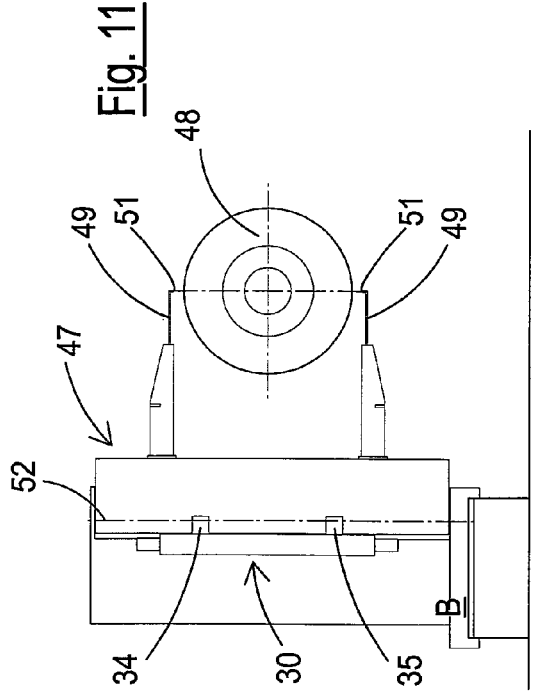
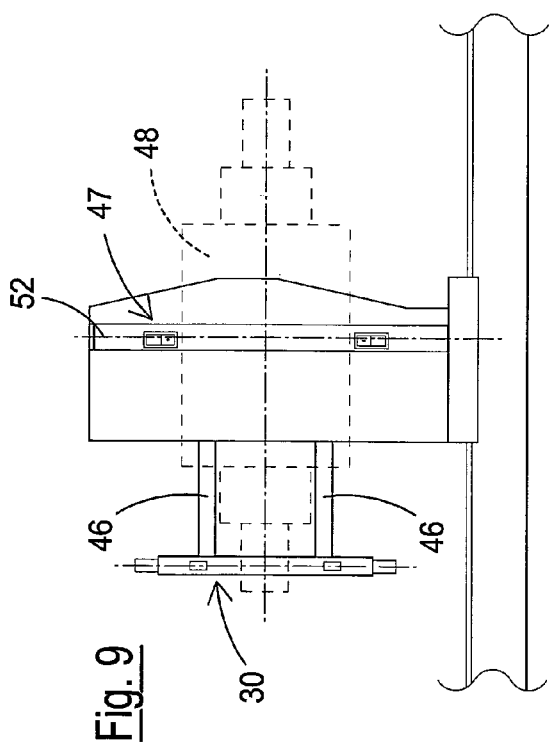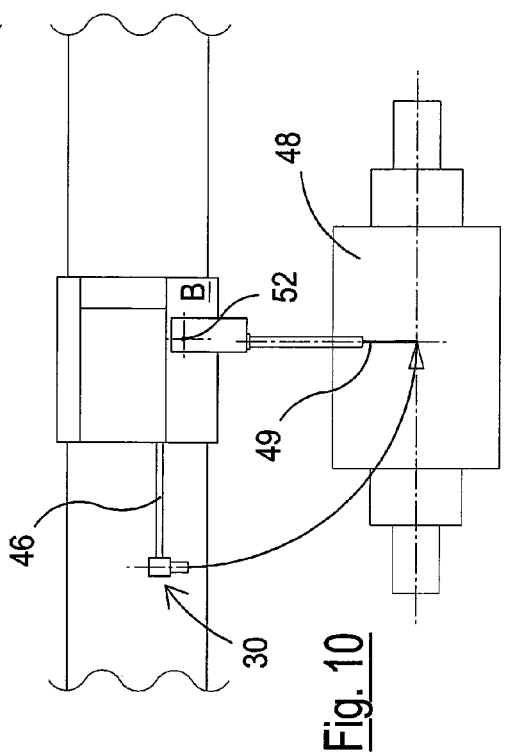

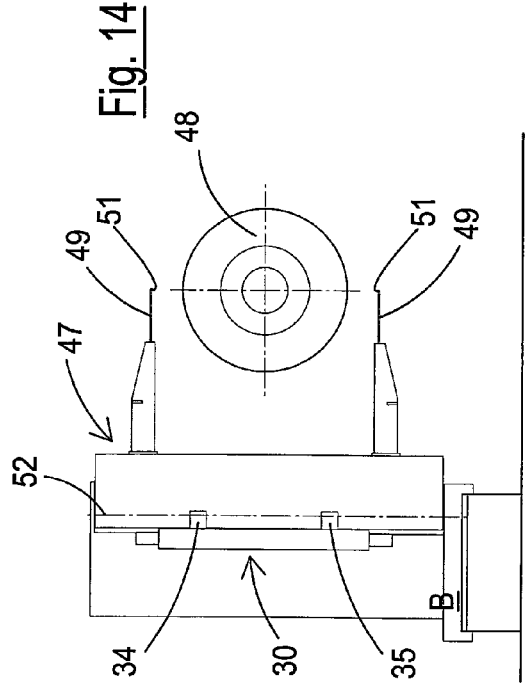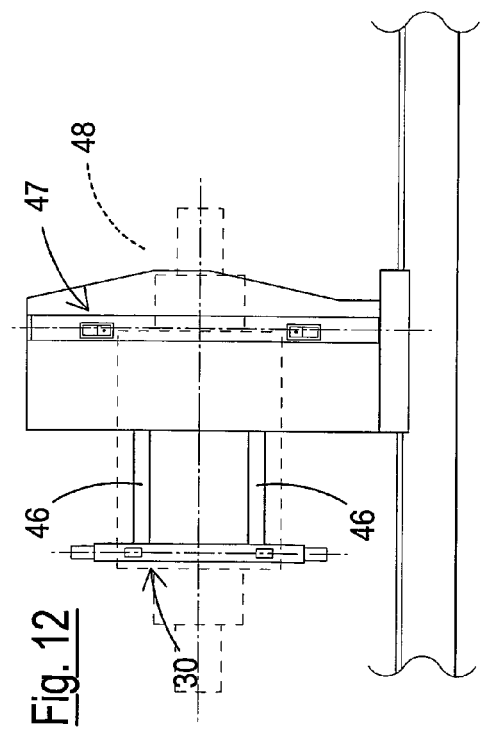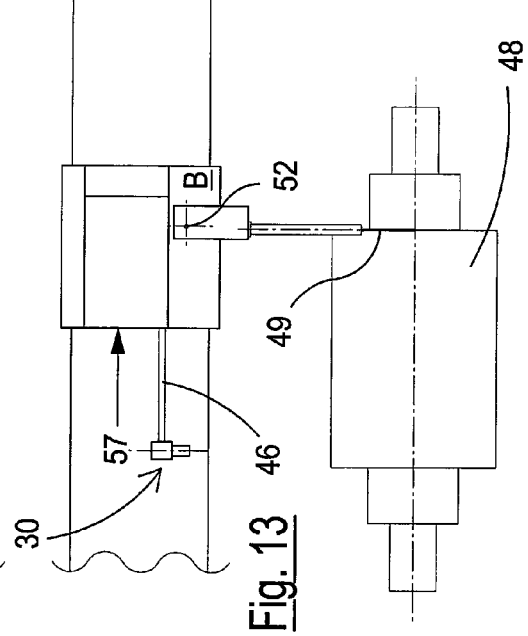

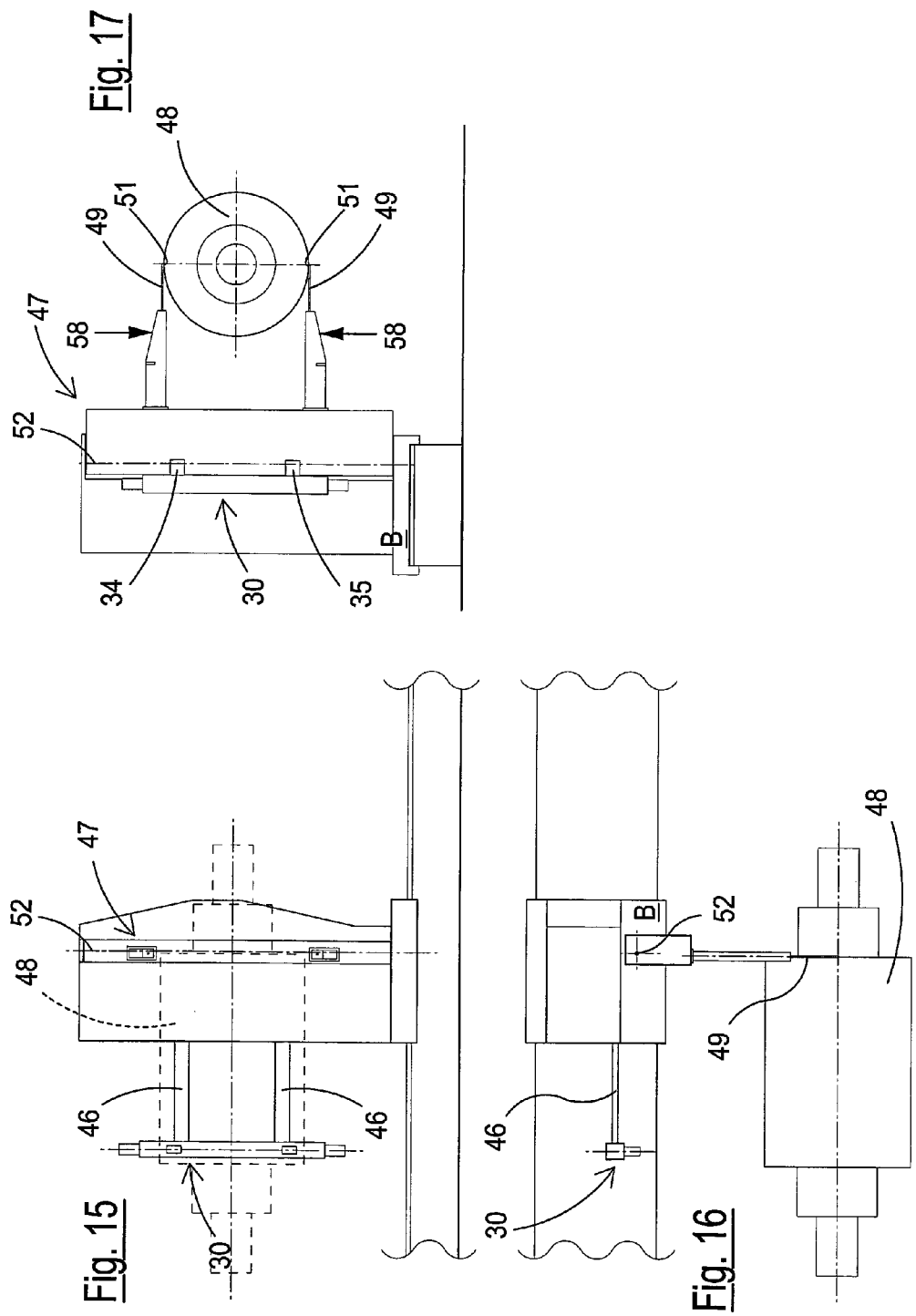

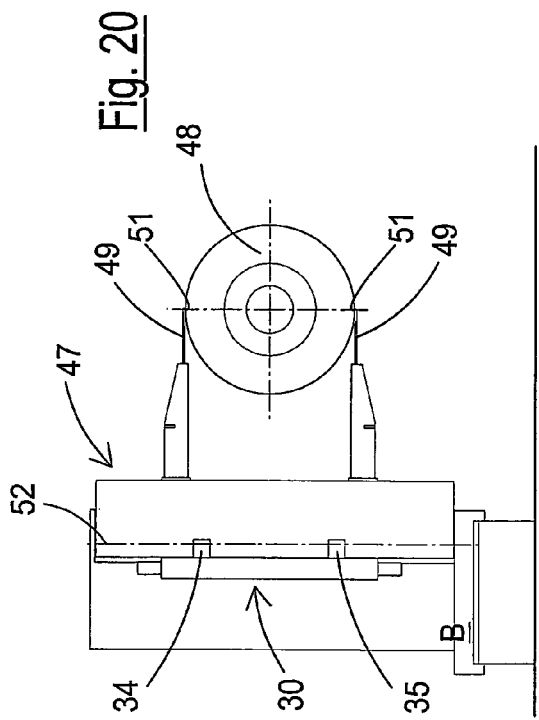
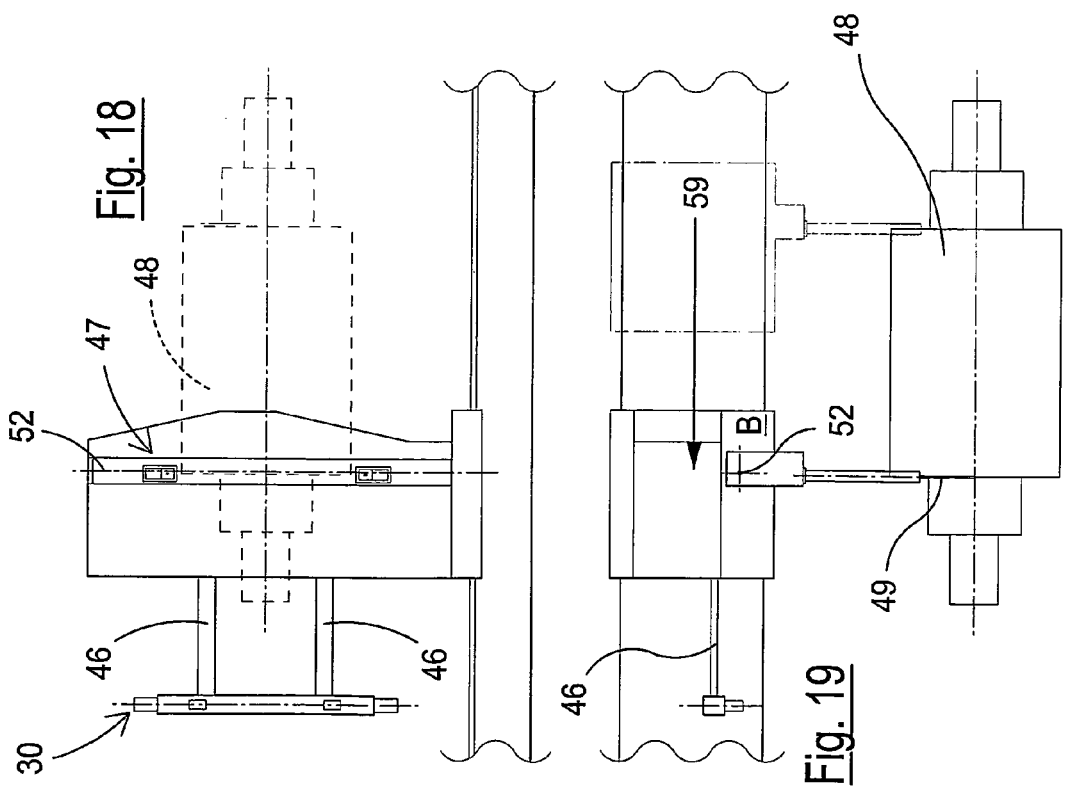

CALIBRATION DEVICE FOR MEASUREMENT GAUGES OF THE DIAMETER AND OTHER GEOMETRICAL CHARACTERISTICS OF CYLINDERS

The present invention relates to a calibration device (so-called "preset") for measurement gauges of the diameter and other geometrical characteristics of cylinders, such as, for example, the rotundity, eccentricity and profile.

An example of the application of these gauges is represented by their use on grinding machines for cylinders used in industry (for example cylinders for mills, cylinders for paper production, etc.).

The current grinding technology of cylinders, whether these be destined for use in mills for metals, or in plants for the production of paper, requires the use of measurement instruments, commonly called "gauges" whose function is to make the following surveys:

Measurements of the profile of the generatrix of the cylinder,
Measurements of the form of the section of the cylinder (eccentricity, rotundity),
Measurements of the diameter (absolute measurements).

Measurement gauges of the known type are described for example in the U.S. Pat. No. 3,391,497, U.S. Pat. No. 4,807,400 and U.S. Pat. No. 4,811,524.

The present invention relates to a calibration device for gauges destined for effecting all of the above measurements, but dedicated, in particular, for substantially improving the accuracy of these gauges in the measurement of absolute diameters.

According to the known art, these devices are common measurement instruments (centesimal gauges, trolley gauges), which are used manually by the operator for effecting the required measurements, but it is now customary for grinding machines for cylinders to be equipped with specific measurement instruments, which allow measurements to be made automatically, also during the grinding process, in order to enable the control system (CNC) of the grinding machine to correct various parameters during the processing cycle.

These gauges can be classified into the following families:
trolley gauges; and
independent gauges.

Trolley gauges have the characteristic of being installed onboard the grinding wheel-holder trolley, they can effect the above measurements but are limited by the fact that the movement of the gauge along the generatrix of the cylinder is restricted to that of the grinding wheel-holder head. This means that movements of the cylinder independent of those of the grinding wheel are not allowed; this limitation is sometimes reflected in prolonged cycle times, referring to the total grinding and measurement times of the cylinder.

Independent gauges are, on the other hand, assembled in front of the machine, on a specific base. They effect the same measurements as trolley gauges, but with the advantage that, as the movement of the gauge is along the generatrix of the cylinder independent of that of the grinding wheel, measurements are also possible when the grinding wheel is operating. This characteristic is reflected in a general reduction in the cycle times.

Disregarding the differences in performances in terms of measurement rate, the solutions described above are comparable with each other, both in terms of accuracy and in terms of precision.

It can generally be affirmed that the performances of the gauges described according to the known art are satisfactory with respect to measurements of the profile and form of the cylinder section, whereas the same cannot be said for the absolute measurements of the diameter.

Without entering into details which go beyond the function of this introduction, it can be affirmed that the lack of accuracy in the absolute measurement of the diameters of the gauges currently available, is generally due to the accumulation of various types of systematic errors, of which the principles are geometrical errors of the guides of the supporting arms of the feelers and other mechanical parts of the gauges themselves in addition, obviously, to the tendency of the materials to modify their own volume in relation to the temperature.

To overcome the drawback of the limited accuracy of the absolute measurement of the diameter of the cylinder, calibration devices, so-called preset, have been introduced into the design of these gauges, which are simply sample disks, reference standards or similar known measurement means. They enable the so-called "presetting" of the gauge, i.e. the feelers or sensors are brought to the ends of the arms of the gauge in contact with the sample having a known dimension, and the measurement is effected; at this point, the control system imposes parity of the measurement revealed by the gauge with the real value of the sample which has been measured; this "actual" measurement has been suitably memorized in the control system of the gauge and of the machine on which it is assembled (CNC), during the set-up of the gauge itself.

Furthermore, in the case of contact sensors, the calibration procedure is also useful for compensating the effect of wear of the sensor itself which slides on the cylinder; the measurement during the processing, with the cylinder consequently in rotation, does in fact damage the surface and as shifts in the order of microns must be detected, the presetting procedure (calibration) is fundamental.

This, in theory, allows the accuracy of the measurements to be greatly improved but in reality this is only true for measurements effected within the range of the sample diameter; when significantly moving away from the sample diameter, the above manufacturing geometrical errors of the gauge reintroduce systematic errors which jeopardize the accuracy of the measurements.

In order to overcome this drawback, gauges have been constructed with more than one sample calibration or preset disk; this allows the gauge to be used within the range of various diameters, but with the limitations previously discussed. Consequently, with respect to what is specified above relating to the state of the art, in order to always effect accurate measurements, the measurement system should be equipped with infinite calibration or "preset" references.

The general objective of the present invention is to overcome the drawbacks of the known art, by providing a calibration device for measurement gauges of geometrical parameters, in particular of the diameter, of cylinders, to be used, for example, in a combination with gauges of grinding machines, having the function of annulling, within the whole measurement range of the gauge, the systematic errors introduced in the measurements of the absolute diameter of the cylinder, due to the inevitable straightness errors of the guides of the gauge, and, more generally, of the manufacturing errors of the structures of the same gauge, in addition to the already mentioned wear phenomenon and in general everything that alters the position and form of the measurement system (temperature variations).

The above objective is achieved by a calibration device having the characteristics specified in the enclosed claims.

The structural and functional characteristics of the present invention, and its advantages with respect to the known art, will appear even more evident from the following description, referring to the enclosed schematic drawings, which show a practical embodiment of the invention itself.

In the drawings:

FIGS. 3 to 23 are schemes illustrating the operative functioning phases of the device of FIG. 1, which will be illustrated in greater detail in the following description.

Figure 1:
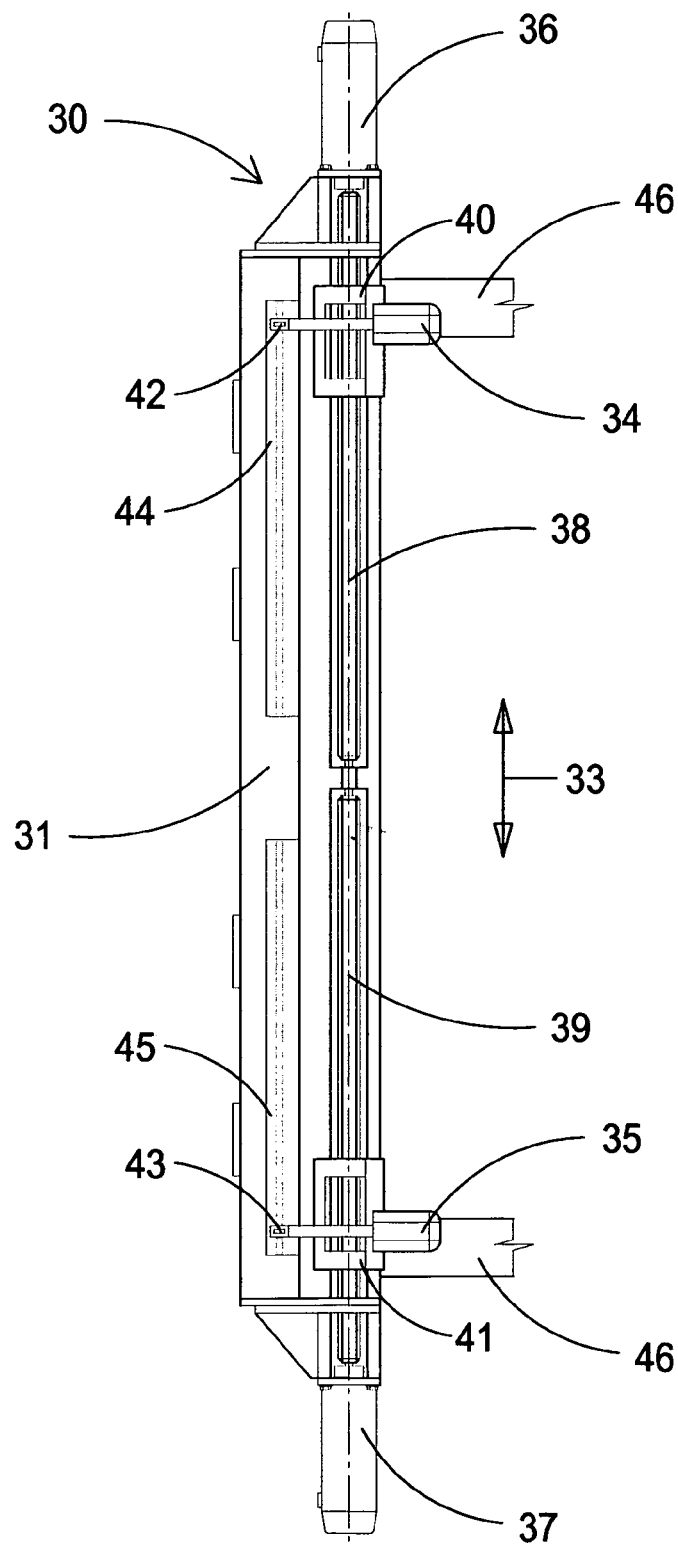
FIG. 1 is a vertical sectional schematic view illustrating an example of a calibration device produced according to the invention.

First of all, with reference to FIG. 1 of the drawings, the calibration device according to the invention is indicated as a whole with 30.

Figure 2:
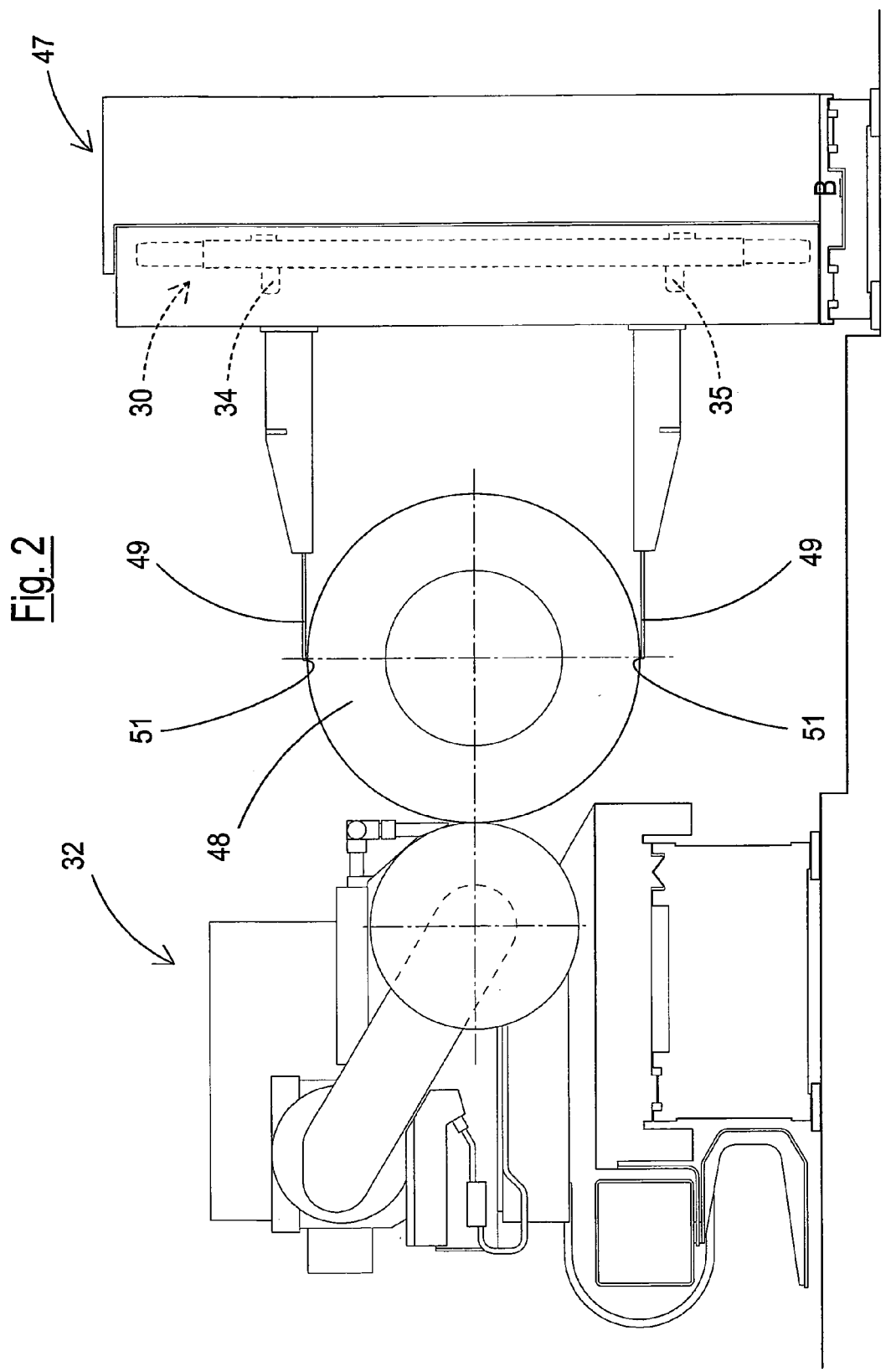
FIG. 2 is a schematic transversal section illustrating an application example of the calibration device of FIG. 1 to a grinding machine for cylinders equipped with a so-called independent gauge.

Said device 30 is composed of a supporting structure 31 suitable for being fixed, by means of a frame schematized with 46, for example a trolley, or movable part B, of a gauge indicated as a whole with 47, cooperating with a grinding machine generally indicated with 32 (FIG. 2).

A pair of abutments 34, 35 is assembled traversably in the direction of the arrow 33, on the supporting structure 31, which is in the form of a column.

Each abutment 34, 35 is driven, independently of the other abutment, by its own motor 36, 37.

The motors 36, 37 rotate the respective screws 38, 39, which are screwed into female screws 40, 41, to which the above abutments 34, 35 are operatively constrained.

The abutments 34, 35 can consequently be selectively driven to translate in the directions of the arrow 33 independently of each other.

Each abutment 34, 35 carries a reader of the known type (also called "head"), schematized in the drawings with 42, 43, each cooperating with a respective optical line 44, 45, constrained to the supporting structure 31.

In the schemes 3-23, a gauge of the known type (for example independent) is schematized with 47, suitable for also measuring, among other things, the diameter of a cylinder 48.

49 indicates the arms of the gauge 47, said arms can, for example, be equipped with feelers 51 which go directly into contact with the cylinder to be measured, or sensors not in contact. Said arms can slide in a vertical direction along the guides of the gauge itself (not shown in the schemes) and cooperate with the calibration or preset device 30 according to the invention, described previously with reference to FIG. 1 of the drawings.

At the free end of said arms 49 there are the measuring feelers or sensors 51 described above, suitable for cooperating with both the above abutments 34, 35, and also with the surface of the cylinder 48.

For the general functioning of examples of gauges of the known type, reference can be made, if necessary, to the US patents cited above.

The functioning of the calibration device. 30 according to the invention is as follows.

Figure 3:
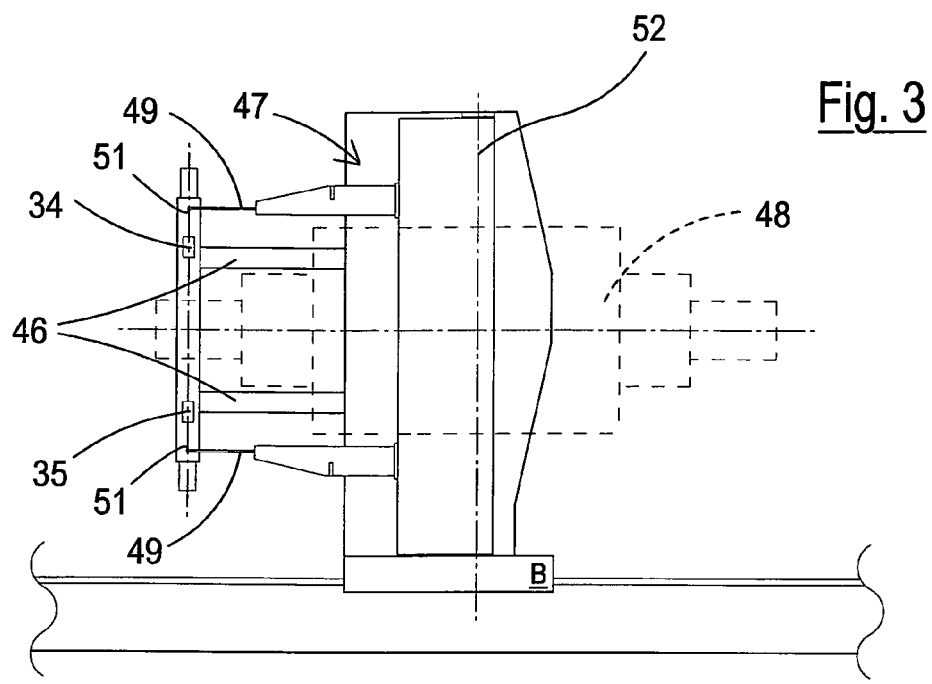
Figure 4:
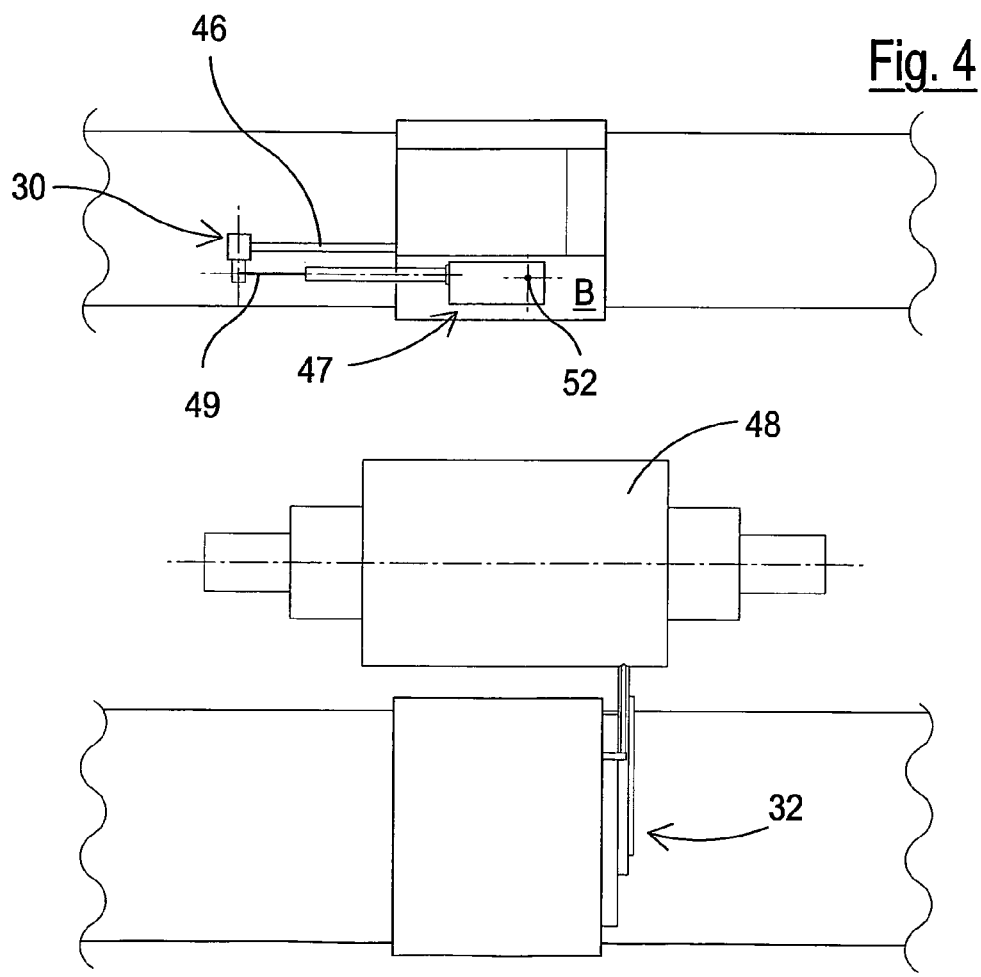

FIGS. 3, 4 are two schemes, respectively raised and plan, illustrating the gauge 47 rotated around the vertical axis 52 in a position where the feelers or sensors 51 of the arms 49 are close to the abutments 34, 35 of the calibration device 30.

In this phase, the position of the abutments 34, 35 has already been calibrated (acting on the motors 36, 37) at a nominal dimension very close (for example equal to the nominal diameter indicated on the manufacturing drawings of the cylinder) to the diameter of the cylinder 48 which is to be revealed. Said dimension is controlled in a closed ring, through the readers 42, 43 which, by sliding along the optical lines 44, 45, read the distance between the abutments 34, 35.

Figure 5:
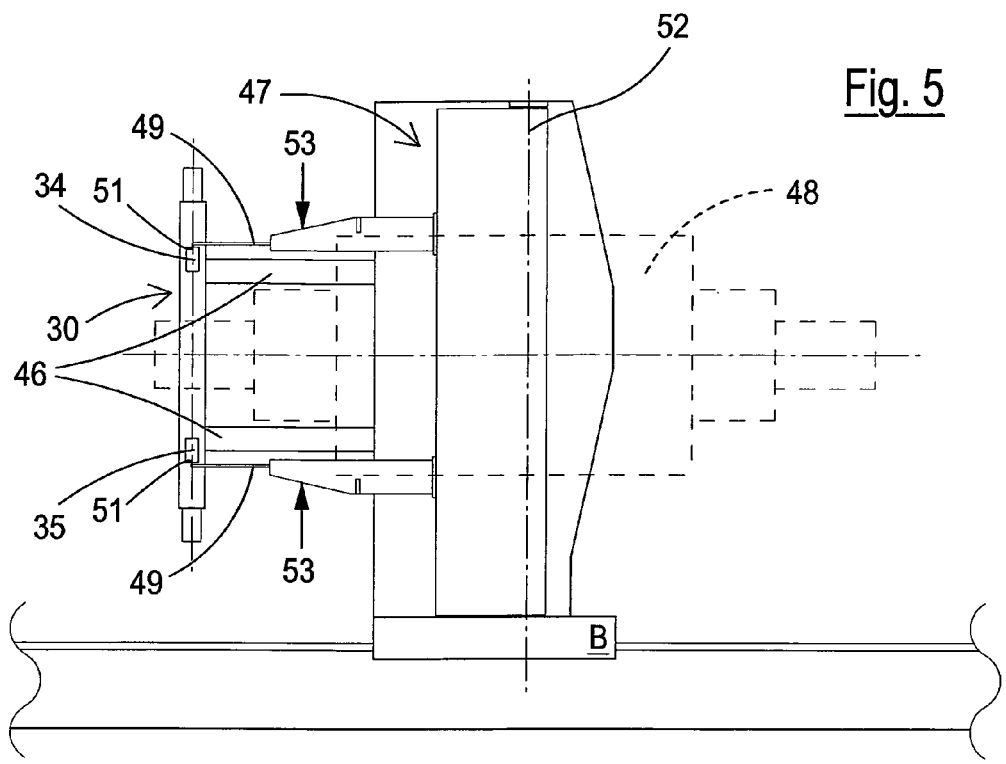
Figure 6:
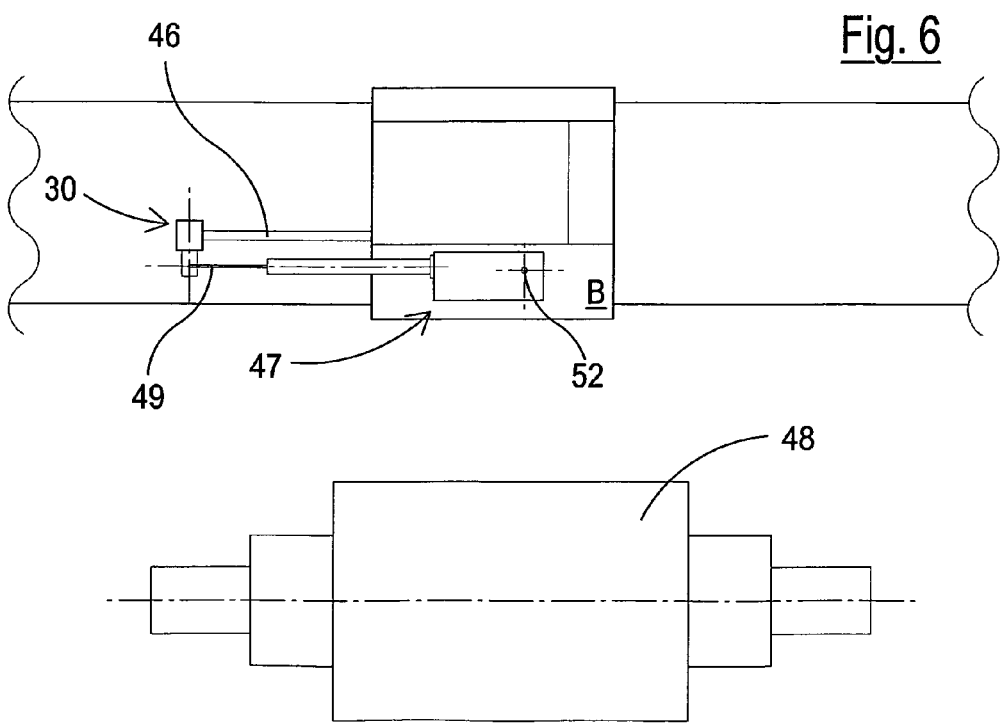

The arms 49 of the gauge 47, by means of the activation devices with which all the gauges are equipped, are then suitably driven so as to be closed in the directions of the arrows 53 in the position of FIGS. 5, 6, bringing the feelers 51 in contact with the abutments 34, 35.

If the elements 51 are sensors not in contact, these are brought relatively close to the abutments to allow them to enter within their own measurement range.

The sample measurement (preset measurement) is thus revealed by the gauge 47, very close to the absolute diameter of the cylinder 48 of which, among the other geometrical characteristics, the real value is to be measured.

Figure 7:
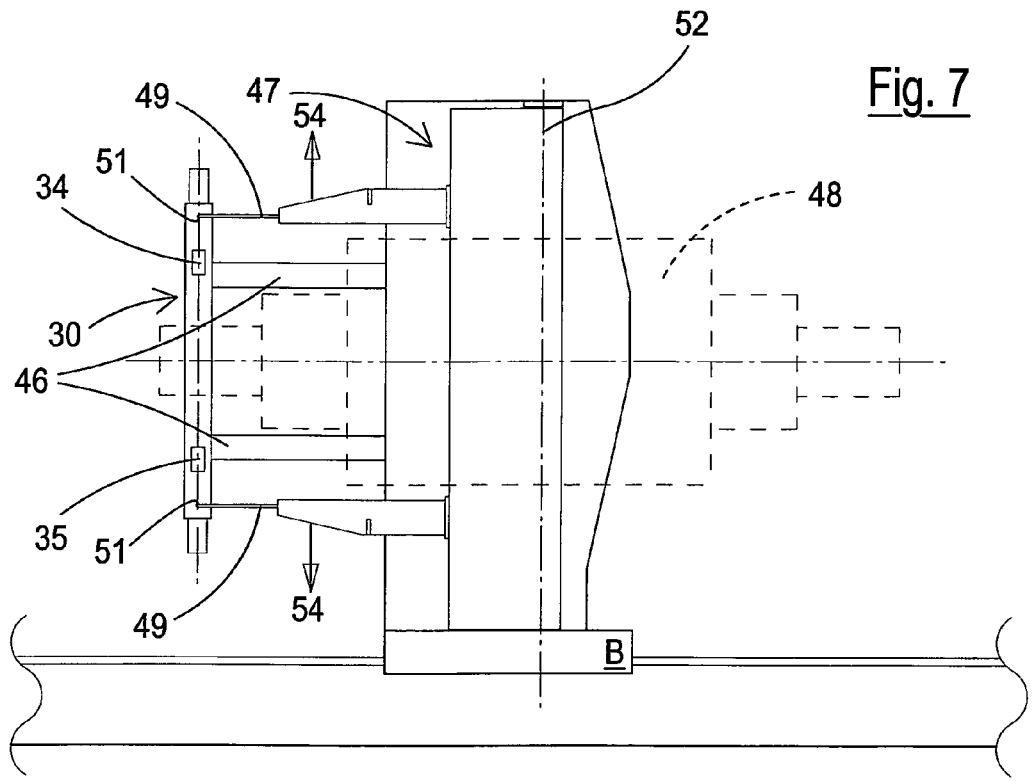
Figure 8:
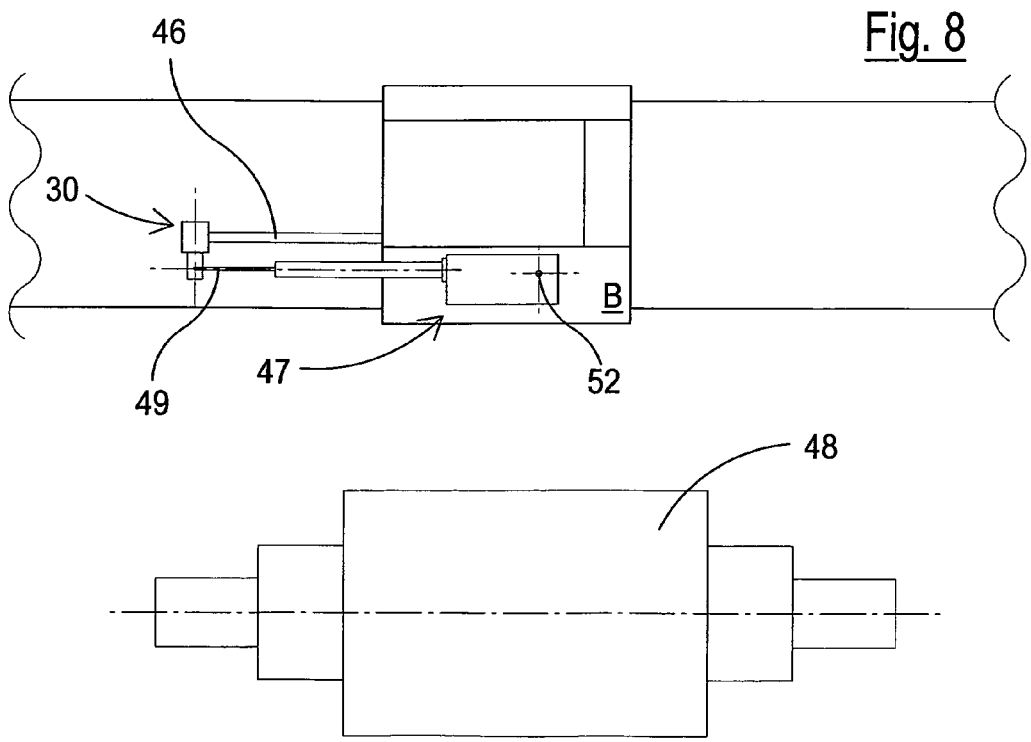
Figure 23:
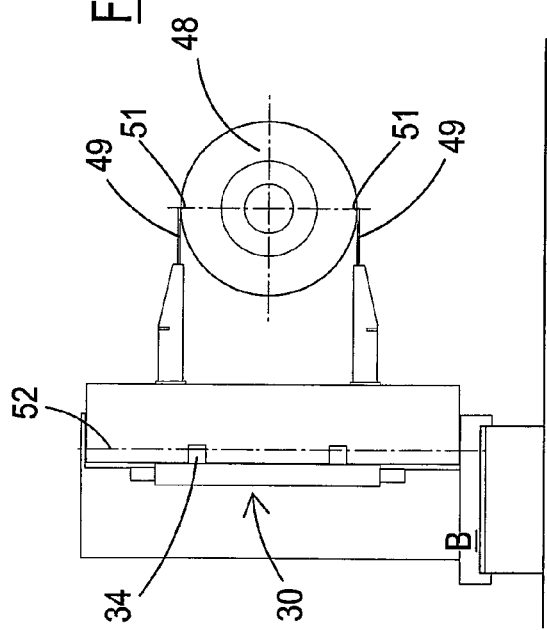
Figure 21:
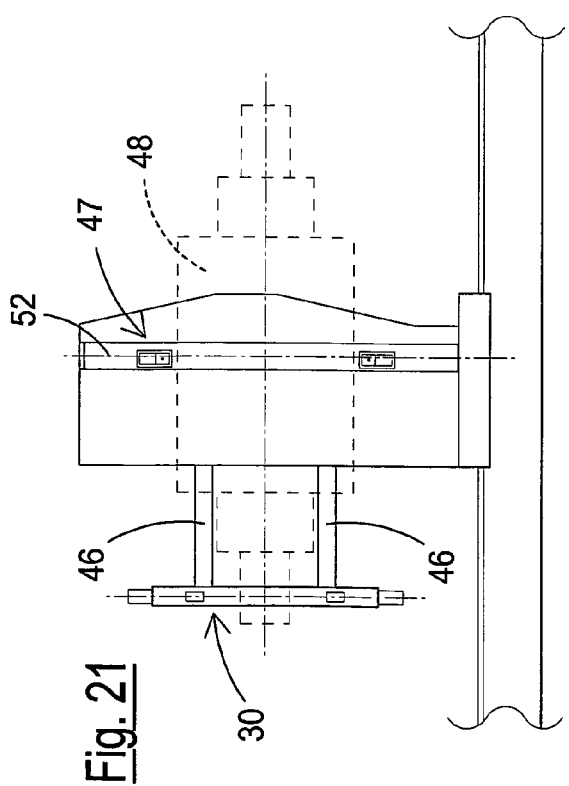
Figure 22:
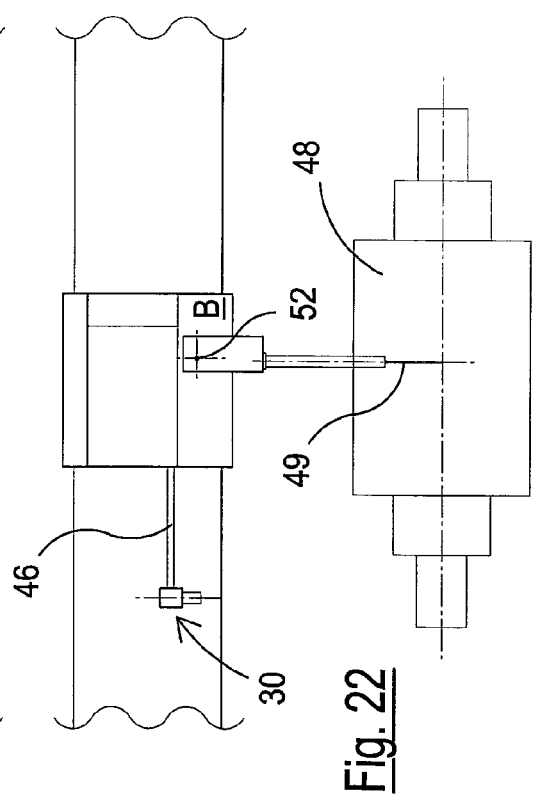

The arms 49 are now translated in the directions of the arrows 54 bringing them into the position of FIGS. 7, 8 and subsequently rotated around the vertical axis 52 in the position of FIGS. 9-11, as indicated by the arrow 55.

In this position, the arms 49 are perpendicular to the cylinder 48, with the feelers or sensors 51 lying in diametrically opposite positions with respect to the same cylinder 48, at a certain distance from this.

The supporting trolley B of the gauge 47 is translated in the direction of the arrow 57 until the gauge 47, with the arms 49 open, is brought in correspondence with an end of the cylinder 48, i.e. at the beginning of the measurement area of the cylinder (FIGS. 12-14).

The arms 49 of the gauge are now translated, by means of the mechanisms with which all gauges are equipped, in the directions of the arrows 58 so as to be closed on the cylinder 48 in the position of FIGS. 15-17.

It is therefore possible to reveal both the profile of the cylinder 48, and also its absolute diameter in the sections of the cylinder envisaged by the measurement cycle, by the translation of the gauge 47 in the directions of the arrow 59, as also the rotundity and the eccentricity of the same cylinder 48, again in the sections envisaged by the measurement cycle, generally: table end piece-holder head-side, table centre, table end counter tip-side (FIGS. 18-23).

At this point, the measurement cycle is complete.

The objective indicated in the preamble of the description has therefore been achieved.

The fundamental advantage of the invention lies in the fact that, thanks to the movable abutments 34, 35, with a controlled position, of the calibration device 30, it is possible to bring (preset) the arms 49 of the gauge 47 to a measurement close to that to be revealed, minimizing, in fact, almost annulling the systematic errors which are at the basis of the lack of accuracy of these measurements, when effected with known systems.

The calibration device according to the known invention can naturally be used in combination with any gauge of the known type.

The protection scope of the invention is defined by the following claims.

The invention claimed is:

1. A gauge calibration device for gauges for measuring geometrical characteristics of cylinders, wherein said gauges comprise a pair of movable opposing arms equipped with feelers or sensors at free ends of the movable opposing arms, comprising:
   a pair of abutments reciprocally approachable or withdrawable by motors until a sample measure is obtained, as desired, within a measuring range of the gauge on which this calibration device is assembled; and measuring means cooperating with said abutments, such that said feelers or sensors (51) are respectively abutted or approached to said abutments to sense said sample measure, thereby providing said sample measure.

2. The device according to claim 1 wherein said abutments are integral with respective female screws in which male screws are screwed, rotated by said motors.

3. The device according to claim 1, wherein said measurement means comprise readers integral with said abutments and cooperating with optical lines integral with a supporting structure.

* * * * *